(12) United States Patent
Hick et al.

(10) Patent No.: US 6,526,260 B1
(45) Date of Patent: Feb. 25, 2003

(54) CROSS-CHANNEL INTERFERENCE

(75) Inventors: Brian H Hick, Calne (GB); David A Sawyer, Swindon (GB)

(73) Assignee: Mitel Semiconductor Limited, Swindon (GB)

( * ) Notice: Subject to any disclaimer, the term of this patent is extended or adjusted under 35 U.S.C. 154(b) by 402 days.

(21) Appl. No.: 09/599,925

(22) Filed: Jun. 22, 2000

(30) Foreign Application Priority Data

Jun. 24, 1999 (GB) .............................................. 9914633

(51) Int. Cl.$^7$ .............................................. H04B 17/00
(52) U.S. Cl. .................... 455/67.1; 455/67.3; 455/67.4; 455/226.1; 455/423; 455/425
(58) Field of Search .............................. 455/67.1, 67.3, 455/67.4, 226.1, 63, 423, 424, 425, 450, 317

(56) References Cited

U.S. PATENT DOCUMENTS

| | | | |
|---|---|---|---|
| 5,263,055 A | * 11/1993 | Cahill | 455/317 |
| 5,295,138 A | * 3/1994 | Greenberg et al. | 455/63 |
| 5,745,839 A | * 4/1998 | Lieberman | 455/63 |
| 6,061,568 A | * 5/2000 | Dent | 455/450 |
| 6,144,692 A | * 11/2000 | Beck | 455/67.1 |
| 6,397,041 B1 | * 5/2002 | Ballard et al. | 455/226.1 |

FOREIGN PATENT DOCUMENTS

| | | | |
|---|---|---|---|
| EP | 1063783 A2 | * 12/2000 | .......... H04B/7/005 |
| EP | 1067698 A1 | * 1/2001 | ............ H04B/1/10 |
| GB | 1577556 | 10/1980 | |
| GB | 2073895 A | 10/1981 | |

* cited by examiner

Primary Examiner—Thanh Cong Le
Assistant Examiner—Lana Le
(74) Attorney, Agent, or Firm—Kirschstein, et al.

(57) ABSTRACT

In a multi-channel electrical communication system 1, a method of estimating the interference level in a test channel due to the intermodulation of two or more other channels, where each channel is centred upon a carrier frequency. The method comprises, for a given m-th order mode, an initial step of identifying the set(s) of carrier frequencies, the m-th order linear combination of which gives rise substantially to the carrier frequency of said test channel. This process is carried out by a computer 2. For the or each of the identified set of carrier frequencies, signal generators 3 are tuned to respective ones of the carrier frequencies. The generated signals are applied to an input of the communication system 1, and the intermodulation interference at the carrier frequency of the test channel is measured at an output of the system 1.

11 Claims, 2 Drawing Sheets

CROSS-CHANNEL INTERFERENCE

FIELD OF THE INVENTION

The present invention relates to cross-channel interference and in particular, though not necessarily, to the measurement of cross-channel interference levels in high frequency receivers.

BACKGROUND TO THE INVENTION

In many multi-channel electrical communication systems operating at radio or microwave frequencies, a significant source of noise in a given channel arises from cross-channel interference, i.e. due to the intermodulation of the signals carried by two or more other channels. In order to optimise system performance, designers seek to measure cross-channel interference levels as a step towards reducing interference.

Considering for example a cable television receiver which is capable of receiving many individual television channels, the design stage of the receiver typically involves measuring the noise level in each channel due to cross-channel interference. This is carried out using an array of signal generators corresponding in number to the number of channels. Each signal generator is set to generate a signal which is centred upon the carrier frequency of a corresponding television channel. The output of the signal generators are combined and fed to an input of the receiver.

Measuring equipment, e.g. a spectrum analyser, is connected to an output of the receiver and is tuned in turn to each of the channel carrier frequencies. For each channel, the signal generator responsible for generating the carrier frequency of that channel is switched off, such that the measured signal corresponds substantially to the cross-channel interference power level. The output of the signal generators may be modulated to some extent to simulate the information component which would normally be carried by the channel, i.e. a television picture. In order to isolate the channels chiefly responsible for cross-channel interference in a given channel, signal generators may be switched on and off in turn.

It will be appreciated that, particularly for a system designed to handle a large number of channels, the above test system will require an extremely large number of signal generators. For example, testing of a modem cable television receiver may require the use of over a hundred signal generators. Such a test system is complex and expensive to implement. Furthermore, the process of isolating those channels which are responsible for cross-channel interference at any given channel, requiring as it does the switching on and off of signal generators, is time consuming and prone to error.

SUMMARY OF THE INVENTION

It is an object of the present invention to overcome or at least mitigate the disadvantages of known cross-channel interference test systems. It is also an object of the present invention to provide a cross-channel interference test system which requires only a relatively small number of signal generators to simulate cross-channel interference effects.

According to a first aspect of the present invention there is provided, in a multi-channel electrical communication system, a method of estimating the interference level in a test channel due to the intermodulation of two or more other channels, where each channel is centred upon a carrier frequency, the method comprising, for a given m-th order mode:

identifying the set(s) of carrier frequencies, the m-th order linear combination of which gives rise substantially to the carrier frequency of said test channel; and for the or each of the identified set of carrier frequencies, tuning signal generators to respective ones of the carrier frequencies, applying the generated signals to an input of the communication system, and measuring at an output of the system the intermodulation interference at the carrier frequency of the test channel.

Where a plurality of sets of carrier frequencies are identified as combining to generate intermodulation interference in the test channel, the same signal generators are used for each set, and are merely retuned to the necessary frequencies. The total interference level for the mode in question may be determined by adding together the measured result for each set.

The present invention allows the total intermodulation interference which will occur in a given channel to be predicted using only a relatively small number of signal generators, i.e. the number of signal generators corresponds to the intermodulation mode under investigation. Rather than providing a signal generator for each channel, signal generators are re-used to determine the intermodulation interference for each set of carrier frequencies which are predicted to cause interference at the test channel. It is generally only necessary to measure intermodulation interference in a multi-channel system for relatively low order modes. For example, it may be sufficient to measure intermodulation interference for only the second and third modes. For the second mode, using the present invention, only two signal generators are required, whilst for the third mode three signal generators are required. This is in contrast to conventional test processes where the number of signal generators required corresponds to the total number of channels (or one less than the total number of channels).

Preferably, for the or each identified set of carrier frequencies, it is determined whether or not the frequencies of the set will give rise to inter-modulation interference at modes higher or lower than the mode in question, i.e. m. If such higher and/or lower mode interference is likely to arise, the output of two or more of the signal generators may be offset from the respective carrier frequencies such that the higher and/or lower mode intermodulation interference is shifted away from the carrier frequency of the test channel whilst that due to the m-th order intermodulation remains at the carrier frequency of the test channel.

It is possible to predict the change in the intermodulation interference power level at the test channel which will result from a given change in the power level of one or more of the channels contributing to the interference. Using suitable power relationships, the invention may be applied to predict the interference power level which will result from a set of channels having respective power levels, by measuring the interference power levels which result from the same set of channels having different power levels. The measured output powers are normalised, in accordance with the power relationships, to provide the necessary prediction.

Similarly, normalisation may be applied to the measured output powers in order to take account of a non-uniform frequency response. For example, where the input channels have a uniform power level, the measured output powers may be normalised to simulate the effect of non-uniform power levels, e.g. due to the frequency response of a signal transmission medium.

Preferably, the method of the present invention is repeated for each intermodulation interference mode which is expected to contribute significantly to cross-channel interference.

According to a second aspect of the present invention there is provided apparatus for testing a multi-channel communication system to estimate the interference level in a test channel due to the intermodulation of two or more other channels, where each channel is centred upon a carrier frequency, the apparatus comprising:

processing means for identifying the set(s) of carrier frequencies, the m-th order linear combination of which gives rise substantially to the carrier frequency of said test channel;

signal generators arranged to be tuned to respective ones of identified carrier frequencies of the or each set to provide output signals to an input of a communication system under test; and measuring means for measuring the output of said system under test to determine the inter-modulation interference at the carrier frequency of the test channel.

Where a plurality of sets of carrier frequencies are identified by the processing means, the signal generators are arranged to be tuned to the first set of frequencies, followed by the second set, etc. The measuring means is preferably arranged to add the measured outputs for each set of frequencies.

Preferably, the processing means is provided by a computer, the computer further being arranged to control the signal generators. The computer may also provide the measuring means.

DETAILED DESCRIPTION OF CERTAIN EMBODIMENTS

Figure 1:
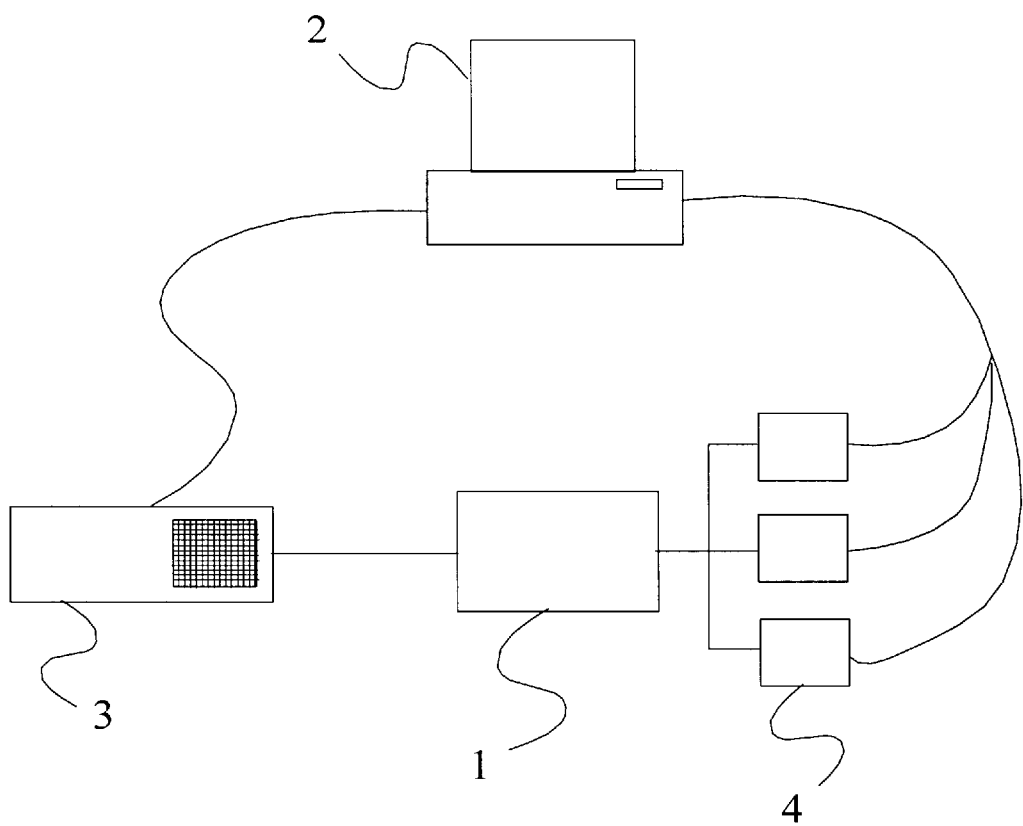
FIG. 1 illustrates schematically a test system for predicting cross-channel interference.

There is illustrated in FIG. 1 a system for testing a multi-channel communication receiver 1 to determine or predict cross-channel interference. The nature of the receiver 1 is not of interest here, although it may be, for example, a cable or satellite television receiver arranged to receive frequency division multiplexed (FDM) television signals. The test system is controlled by a computer 2 which may be a PC, workstation, or the like, and further comprises a spectrum analyser 3 and a set of signal generators 4. Both the spectrum analyser 3 and the signal generators 4 are controlled by the computer 2, with the output of the spectrum analyser 3 being delivered to the computer 2 for further processing.

The various channels which the receiver 1 is intended to receive are centred upon respective carrier frequencies F. It is known that for second order intermodulation, the frequency relationships capable of interfering at a carrier frequency $F_c$ are those sets of carrier frequencies $F_1$, $F_2$, where:

$$F_c = F_1 + F_2$$

or $$F_c = F_1 - F_2$$

It is similarly known that for third order inter-modulation, the frequency relationships capable of interfering at the carrier frequency $F_c$ are those sets of carrier frequencies $F_1$, $F_2$, and $F_3$, where:

$$F_c = F_1 + 2F_2 \quad F_c = F_1 + F_2 + F_3$$
$$F_c = F_1 - 2F_2 \quad F_c = F_1 + F_2 - F_3$$
$$F_c = 2F_1 + F_2 \quad F_c = F_1 - F_2 + F_3$$
$$F_c = 2F_1 - F_2 \quad F_c = F_1 - F_2 - F_3.$$

Similar relationships can be defined for fourth and other higher order modes.

Prior to initiating the test procedure to determine the cross-channel interference at a given "test" channel, a program is run on the computer 2 to search for all the possible sets or combinations of channel carrier frequencies which are capable of giving interference products of the order being considered, e.g. second, third, etc. The program excludes however "duplicate" combinations of carrier frequencies. For example, consider two carrier frequencies $F_1$ and $F_2$. If $F_1$ is 60MHz and $F_2$ is 48 MHz, an intermodulation product will occur at 108 MHz. The same result will occur if $F_1$ is 48 MHz and $F_2$ is 60 MHz. One of these alternatives is therefore excluded from the final set, for example by imposing the condition that $F_2$ should always be less than $F_1$. It will be appreciated that for a receiver capable of handling many channels, for example several hundred, a large number of combinations or sets of carrier frequencies may generate cross-channel interference at the test channel and at a given intermodulation mode.

Having established each valid frequency set for the test channel, the computer 1 considers each of the sets in turn and, for each set, tunes respective signal generators 4 to the carrier frequencies. The output signals of the generators 4 are combined and applied to the input of the receiver 1 under test. The computer 2 then tunes the spectrum analyser 3 to the carrier frequency of the test channel, and triggers the analyser 3 to measure the interference power level in the test channel for each successive set of carrier frequencies at which the signal generators are driven.

The individual intermodulation powers, together with the characteristics of the input signals from which they result, are stored in a data file held by the computer 2. The computer 2 may subsequently process and present the data as required to show the system performance and to highlight any areas of particular concern. For example, the power contributions measured for each set of frequencies for a given mode may be summed to give a cumulative interference power level for the test channel and for the intermodulation order in question. The data collected is a major aid to isolating and eliminating the chief interference sources.

Figure 2:
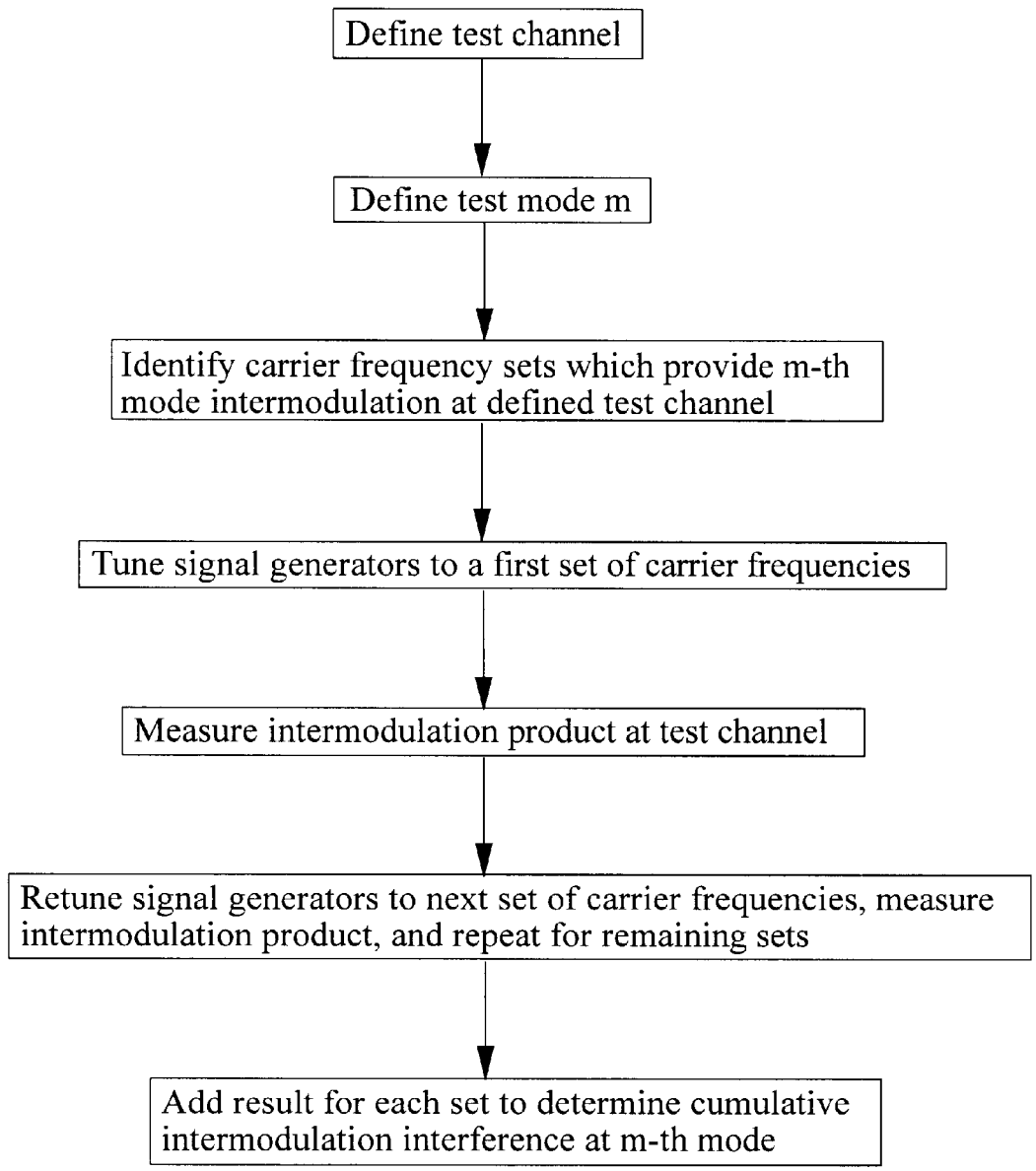
FIG. 2 is a flow diagram illustrating a method of operation of the test system of FIG. 1.

The above process is illustrated further by the flow diagram of FIG. 2.

It is noted that certain combinations of input frequencies can give rise to inter-modulation products of more than one order at the same resultant carrier frequency. For example, frequencies at A=2C/3 and B=C/3 will satisfy both the relationships C=A+B (second order) and C=2A-B (third order). However, if a small offset X is added to A and subtracted from B, the second order product remains C, whilst the third order product becomes C+3X. If the measurement window of the spectrum analyser 3 is restricted such that the frequency C+3X falls outside the window, the unwanted third order product can be excluded from the second order measurement. By suitable choice of offset frequencies for each of the relationships set out above, it is possible to exclude all the extraneous products from a study of any one particular order.

Further enhancements to the measurement process may be introduced by making use of the relationships between the input signal power levels and the resulting intermodulation (IM) product power level for any particular combination of input signals. For a first-order (first harmonic) contribution from an input source, the inter-modulation power output is proportional to the input power; for a second-order (second harmonic) contribution, the intermodulation power output is proportional to the square of the input power; for a third-order (third harmonic) contribution, the intermodulation power output is proportional to the cube of the input power. Thus, for the relationship $$F_c=F_1+F_2+F_3$$

an increase of the input power from any one of the signal generators 4 of 1dB will result in an increase in the IM product of 1 bB whilst if the inputs from all three generators are increased by 1 bB, the output will increase by 3dB.

Similarly, for the relationship $$F_c=F_1+2F_2$$

an increase of 1dB from the $F_1$ signal generator will increase the output by 1 bB, whilst an increase of 1dB from the $F_2$ signal generator will increase the output by 2 dB since this generator is making a second-order contribution. Again, if the inputs from both generators are increased by 1dB, the output will increase by 3dB.

The above power relationships may be used to allow an intermodulation power measurement to be made at one input level, for example to ensure that the measured power is suitably within the dynamic range of the spectrum analyser 3, with the results being "normalised" to simulate another input level, for example an input level corresponding to a system specification. Normalisation may be applied either globally to the cumulative (i.e. summed) result, or individually to each measured contribution. In the latter case, the input levels may be adjusted for each measurement to match the output to the spectrum analyser range, and the results adjusted to simulate a single input level across the whole frequency band.

This last technique may be further extended to simulate an input level which is not constant across the band, for example to make allowance for the frequency characteristics of the transmission medium. It may be convenient to make all measurements at a constant input level, but to normalise the output to a situation where inputs at higher frequencies have lower power levels than those inputs at relatively lower frequencies.

It will be appreciated that it is generally necessary to take steps to ensure that all the applied input power levels are within the normal operating range of the receiver under test, and do not exercise it in regions where gain compression or other forms of non-linear linear behaviour become significant. It will also be appreciated that it may be necessary to make proper provision for the behaviour of any automatic gain control systems if present.

It will be appreciated by the person of skill in the art that various modifications may be made to the above described embodiments without departing from the scope of the present invention. For example, the measurement role of the spectrum analyser 3 may be integrated into the computer 2. Similarly, the computer may also perform the functions of the signal generators, so that the test system comprises substantially only a single computer.

What is claimed is:

1. In a multi-channel electrical communication system, a method of estimating the interference level in a test channel due to the intermodulation of two or more other channels, where each channel is centered upon a carrier frequency, the method comprising, for a given m-th order mode, the steps of:

identifying at least one set of carrier frequencies, the m-th order linear combination of which gives rise substantially to the carrier frequency of said test channel; and for the at least one identified set of carrier frequencies, tuning signal generators to respective ones of the carrier frequencies, applying the generated signals to an input of the communication system, and measuring at an output of the system the intermodulation interference at the carrier frequency of the test channel.

2. A method according to claim 1, wherein, where a plurality of sets of carrier frequencies are identified as combining to generate intermodulation interference in the test channel, the same signal generators are used for each set, and are retuned to the necessary frequencies.

3. A method according to claim 2, wherein the total interference level of the m-th order mode is determined by adding together the measured result for each set.

4. A method according to claim 1, wherein said m-th mode is one of the second and third order modes, and the number of signal generators used is two and three respectively.

5. A method according to claim 1, wherein, for the at least one identified set of carrier frequencies, it is determined whether or not the frequencies of the set will give rise to intermodulation interference at modes higher or lower than the mode in question, and, if such higher and/or lower mode interference is likely to arise, the output of two or more of the signal generators is offset from the respective carrier frequencies such that the higher and/or lower mode intermodulation interference is shifted away from the carrier frequency of the test channel while that due to the m-th order intermodulation remains at the carrier frequency of the test channel.

6. A method according to claim 1, and comprising predicting the interference power level which will result from a set of channels having respective power levels, by measuring the interference power levels which result from the same set of channels having different power levels and normalizing the measured output powers, in accordance with predefined power relationships, to provide the necessary prediction.

7. A method according to claim 1, and comprising normalizing the measured output powers in order to take account of a non-uniform frequency response.

8. A method of measuring the total intermodulation interference in a test channel of a multi-channel electrical communication system, the method comprising repeating the method of claim 1 for a plurality of different modes.

9. Apparatus for testing a multi-channel communication system to estimate the interference level in a test channel due to the intermodulation of two or more other channels, where each channel is centered upon a carrier frequency, the apparatus comprising:

processing means for identifying at least one set of carrier frequencies, the m-th order linear combination of which gives rise substantially to the carrier frequency of said test channel;

signal generators arranged to be tuned to respective ones of identified carrier frequencies of the at least one set to provide output signals to an input of a communication system under test; and measuring means for measuring the output of said system under test to determine the inter-modulation interference at the carrier frequency of the test channel.

10. Apparatus according to claim 9, wherein the signal generators are arranged, where a plurality of sets of carrier frequencies are identified by the processing means, to be tuned to the first set of frequencies, followed by the second set.

11. Apparatus according to claim 10, wherein the processing means is provided by a computer, the computer further being arranged to control the signal generators.

* * * * *